E. B. MERRILL.
BREAD BOARD.
APPLICATION FILED JUNE 21, 1918.
1,297,712.
Patented Mar. 18, 1919.
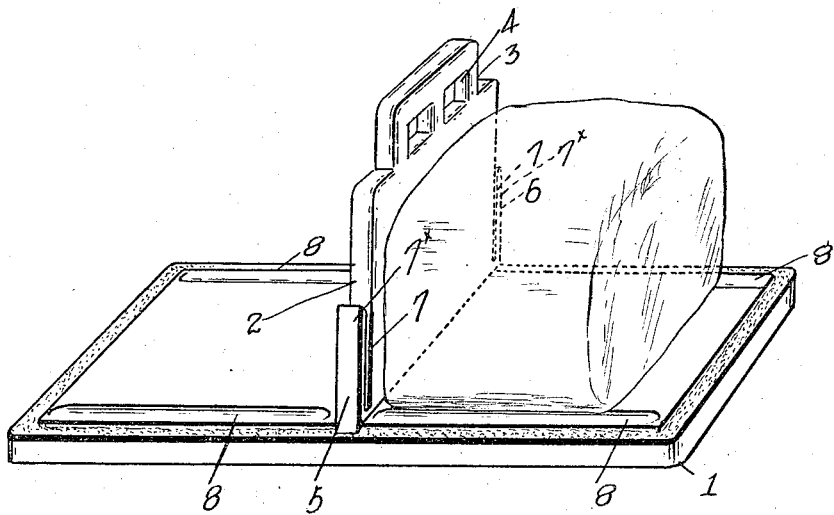
INVENTOR
EDWARD B. MERRILL

UNITED STATES PATENT OFFICE.

EDWARD BELDEN MERRILL, OF TORONTO, ONTARIO, CANADA.

BREAD-BOARD.

1,297,712.     Specification of Letters Patent.     Patented Mar. 18, 1919.

Application filed June 21, 1918. Serial No. 241,243.

*To all whom it may concern:*

Be it known that I, EDWARD BELDEN MERRILL, of the city of Toronto, in the county of York, in the Province of Ontario, Canada, have invented certain new and useful Improvements in Bread-Boards, of which the following is the specification.

My invention relates to improvements in bread boards and the object of the invention is to devise a simple construction of bread board which will provide means against which the cut end of a loaf may be normally held to form a protection against air and consequently preventing the cut end becoming dry, and at the same time form a guide for the eye while cutting so as to help in cutting a slice of uniform thickness, in which means are provided for holding the bread knife in place upon the board when not in use and also to devise a board which may be used as a bread tray for handing the cut bread and it consists essentially of a rectangular board, a cross partition wall extending upwardly from the board intermediately of its length and having orifices at its upper end to form a handle and vertical slits at each side designed to receive the blade of the knife when not in use as hereinafter more particularly explained by the following specification.

The drawing represents a perspective view of my bread board showing portions of a loaf of bread in position thereon.

1 indicates the board proper, which is preferably rectangular in form. 2 indicates a partition wall extending upwardly from the board 1 crosswise thereof and intermediately of its length. The upper end of the partition wall 2 is preferably reduced at 3 and provided in such reduced portions with an orifice or orifices 4 forming a handle by which the board may be lifted. The ends of the partition 2 are provided with extension portions 5 and 6 in which are formed vertical slits 7 forming an upwardly extending tongue-like portion 7*, the inner edge of the upper end being rounded off at 7′ so as to allow of the easy insertion of the knife blade.

The partition wall 2 may be either formed integral with the board 1 or formed detachable so that it may be removed and placed flat upon the board for the purpose of shipment.

In practice when using my board I take a loaf of bread and divide it in half, using one half on each side of the partition wall or I may take a half of a loaf of one kind of bread and a half of a loaf of another kind of bread and place them on each side of the partition wall, the cut end of the loaf bearing against the face of the partition wall 2 thereby protecting it from action of the air and preventing it becoming dry.

When cutting the bread the wall 2 serves as a guide for the knife aiding the user thereof to cut an even slice of bread. When the knife is not in use the blade thereof may be inserted in one of the slits 7, the handle or blade of the knife resting upon the edge of the board.

When the bread is cut it may be placed upon the board and may be handed around by the user taking hold of the handle portion 3 for the purpose of handing it around.

From this description it will be seen that I have devised a very simple construction of bread board which will preserve bread from becoming dry at its cut end, which serves as a convenient means for handing the bread around, which will form a guide for the knife of the user to aid in cutting an even slice and which will form a retainer for the knife when not in use.

Another advantage, which I derive in the use of the board, is that when the bread is cut any number of slices may be left adjacent to the uncut portion of the loaf close together and abutting the center partition, thereby preserving each slice fresh and yet ready for use.

It will also be seen that the partition may be withdrawn so that the board can be shipped in a minimum amount of space and thereby save materially the cost of shipping.

The board 1 at each side of the partition wall 2 may be provided with longitudinally extending grooves 8 extending parallel and in proximity to the longitudinal edges of the board. The grooves 8 are for the purpose of receiving the crumbs which gather on the board preventing them falling on the table cloth.

What I claim as my invention is:

1. In a bread board, the combination with the bread board, of a stationary partition wall extending upwardly therefrom secured to the center of the board and designed to form a carrying handle, and a double face beneath it to protect the two faces of the divided loaf, which are designed to abut each side to prevent a stale crust forming.

2. In a bread board, the combination with the bread board, of a stationary partition wall extending upwardly therefrom secured to the center of the board and designed to form a carrying handle, and a double face beneath it to protect the two faces of the divided loaf, which are designed to abut each side to prevent a stale crust forming, and tongues at each side of the partition forming slits.

EDWARD BELDEN MERRILL.

Witnesses:
M. EGAN,
B. BOYD.

Copies of this patent may be obtained for five cents each, by addressing the "Commissioner of Patents, Washington, D. C."